United States Patent
Ashrafi et al.

(10) Patent No.: US 11,407,413 B2
(45) Date of Patent: Aug. 9, 2022

(54) TECHNIQUES FOR MONITORING POWERTRAIN CRUISE CONTROL PROPULSIVE TORQUE IN ELECTRIFIED VEHICLES

(71) Applicants: Behrouz Ashrafi, Northville, MI (US); Sathya Manivasagam, Bloomfield Hills, MI (US); Feisel F Weslati, Troy, MI (US)

(72) Inventors: Behrouz Ashrafi, Northville, MI (US); Sathya Manivasagam, Bloomfield Hills, MI (US); Feisel F Weslati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 128 days.

(21) Appl. No.: 16/892,380

(22) Filed: Jun. 4, 2020

(65) Prior Publication Data
US 2021/0380107 A1   Dec. 9, 2021

(51) Int. Cl.
*B60W 30/14* (2006.01)
*B60W 10/08* (2006.01)
(Continued)

(52) U.S. Cl.
CPC .......... *B60W 30/143* (2013.01); *B60W 10/08* (2013.01); *B60W 40/076* (2013.01);
(Continued)

(58) Field of Classification Search
CPC .. B60W 30/143; B60W 10/08; B60W 40/076; B60W 50/0205; B60W 50/029; B60W 2552/15; B60W 2050/021; B60W 2050/0292; B60W 2520/105; B60W 2520/16; B60W 2540/10; B60W 2710/083
See application file for complete search history.

(56) References Cited

U.S. PATENT DOCUMENTS 7,254,472 B2   8/2007 Larsen et al.
9,126,592 B2   9/2015 Park et al.
(Continued)

FOREIGN PATENT DOCUMENTS

CN   107415946 A   12/2017
WO   2013175093 A1   11/2013

*Primary Examiner* — Nicholas Kiswanto
*Assistant Examiner* — Jamal A Shah
(74) *Attorney, Agent, or Firm* — Ralph E. Smith

(57) ABSTRACT

Powertrain propulsive torque monitoring and remedial action techniques for a cruise control mode of an electrified vehicle comprise obtaining a set of inputs indicative of a driver torque request and a state/grade of a road along which the vehicle is traveling, operating in a cruise control mode including determining a total torque request for an electrified powertrain, determining and commanding a distribution of the total torque request to the electrified powertrain, and determining the road state/grade based on at least some of the set of inputs, and monitoring the operating in the cruise control mode including determining an actual torque being generated by the electrified powertrain, determining upper and lower acceptable torque limits for the cruise control mode based on the road state/grade, and taking remedial action regarding the cruise control mode when the actual torque is outside of the upper and lower acceptable torque limits.

16 Claims, 5 Drawing Sheets

(51) Int. Cl.
  *B60W 40/076* (2012.01)
  *B60W 50/02* (2012.01)
  *B60W 50/029* (2012.01)

(52) U.S. Cl.
  CPC ...... *B60W 50/0205* (2013.01); *B60W 50/029* (2013.01); *B60W 2050/021* (2013.01); *B60W 2050/0292* (2013.01); *B60W 2520/105* (2013.01); *B60W 2520/16* (2013.01); *B60W 2540/10* (2013.01); *B60W 2552/15* (2020.02); *B60W 2710/083* (2013.01)

(56) References Cited

U.S. PATENT DOCUMENTS

| | | |
|---|---|---|
| 9,630,623 B2 | 4/2017 | Fairgrieve et al. |
| 2006/0178797 A1* | 8/2006 | Larsen ................ B60W 30/188 701/54 |
| 2019/0232940 A1 | 8/2019 | Ashrafi et al. |
| 2019/0291591 A1* | 9/2019 | Suzuki ................... B60L 15/20 |
| 2019/0299977 A1 | 10/2019 | Manivasagam et al. |
| 2019/0315341 A1 | 10/2019 | Ashrafi et al. |
| 2021/0122379 A1* | 4/2021 | Choi ................ B60W 50/0205 |

* cited by examiner

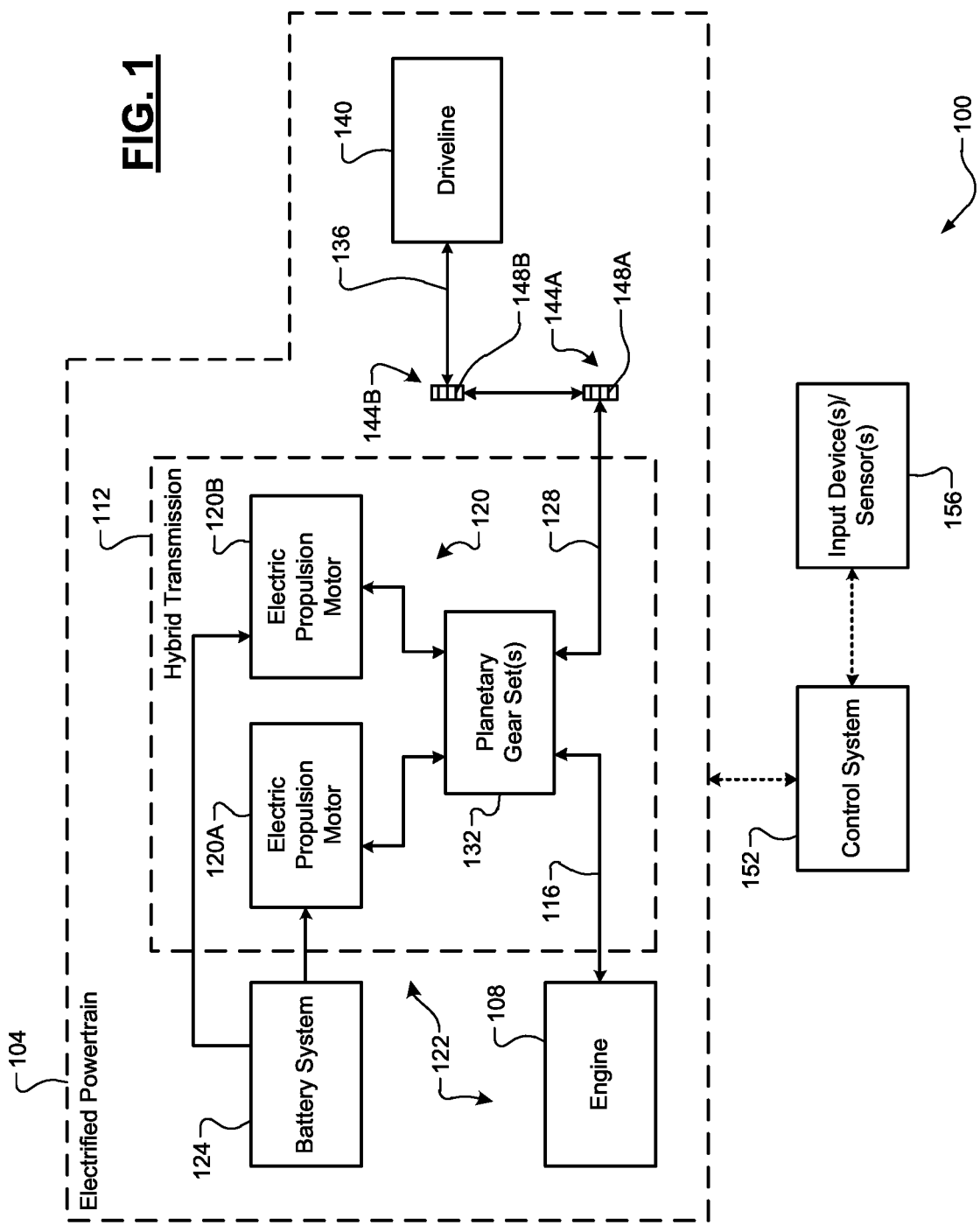

TECHNIQUES FOR MONITORING POWERTRAIN CRUISE CONTROL PROPULSIVE TORQUE IN ELECTRIFIED VEHICLES

FIELD

The present application generally relates to electrified vehicle torque control and, more particularly, to systems and methods for monitoring electrified vehicle powertrain cruise control propulsive torque and taking remedial action when needed.

BACKGROUND

A powertrain of an electrified vehicle (EV) (a battery electric vehicle (BEV), a plug-in hybrid electric vehicle (PHEV), etc.) typically includes an internal combustion engine and/or one or more electric motors that collectively generate and output a desired drive torque to propel the EV. In some cases, the EV powertrain could unintentionally or accidentally generate and output propulsive torque, which could be an undesirable operating scenario. This could occur, for example, when a potential fault or malfunction occurs at a controller, microprocessor, or software that is handling the EV powertrain torque control functionality. Non-limiting examples of these possible faults include memory corruption and software errors. Accordingly, while such EV powertrain control systems do work well for their intended purpose, there remains a need for improvement in the relevant art.

SUMMARY

According to one example aspect of the invention, a powertrain propulsive torque monitoring and remedial action system for a cruise control mode of an electrified vehicle having an electrified powertrain is presented. In one exemplary implementation, the system comprises: a set of input devices/sensors configured to receive a set of inputs indicative of a driver torque request and a state/grade of a road along which the vehicle is traveling and a control system comprising a main control system and a monitoring system that are distinct from each other, wherein: the main control system is configured to operate the vehicle in the cruise control mode including (i) determining a total torque request for the electrified powertrain, (ii) determining and commanding a distribution of the total torque request to the electrified powertrain, and (iii) determining the road state/grade based on at least some of the set of inputs, and the monitoring system is configured monitor the main control system during the cruise control mode including (i) determining the actual torque generated by the electrified powertrain, (ii) determining upper and lower acceptable torque limits for the cruise control mode based on the road state/grade from the main control system, and (iii) taking remedial action when the actual torque is outside of the upper and lower acceptable torque limits.

In some implementations, the remedial action taken by the monitoring system comprises disabling the cruise control mode of the main control system. In some implementations, the remedial action taken by the monitoring system comprises limiting or adjusting at least one of the total torque request and its distribution for control by the main control system during the cruise control mode. In some implementations, the remedial action taken by the monitoring system comprises setting a diagnostic trouble code (DTC).

In some implementations, the set of inputs indicative of the driver torque request include an accelerator pedal position and a desired speed of the vehicle for the cruise control mode. In some implementations, the set of inputs indicative of the road state/grade include a longitudinal acceleration of the vehicle, an actual speed of the vehicle, the desired vehicle speed for the cruise control mode, and a pitch rate of the vehicle. In some implementations, the monitoring system is configured to determine the upper and lower acceptable torque limits based on the road state/grade, the actual vehicle speed, the desired vehicle speed for the cruise control mode, and an acceleration metric.

In some implementations, the main control system and the monitoring system are distinct portions of a single processor. In some implementations, the main control system and the monitoring system are separate cores of the single processor. In some implementations, the main control system and the monitoring system are distributed amongst two or more distinct processors.

According to another example aspect of the invention, a powertrain propulsive torque monitoring and remedial action method for a cruise control mode of an electrified vehicle having an electrified powertrain is presented. In one exemplary implementation, the method comprises: obtaining, from a set of input devices/sensors, a set of inputs indicative of a driver torque request and a state/grade of a road along which the vehicle is traveling, operating, by a main control system of the vehicle, in a cruise control mode including determining a total torque request for the electrified powertrain, determining and commanding a distribution of the total torque request to the electrified powertrain, and determining the road state/grade based on at least some of the set of inputs, and monitoring, by a monitoring system of the vehicle that is distinct from the main control system, the main control system during the cruise control mode including determining an actual torque being generated by the electrified powertrain, determining upper and lower acceptable torque limits for the cruise control mode based on the road state/grade, and taking remedial action regarding the cruise control mode when the actual torque is outside of the upper and lower acceptable torque limits.

In some implementations, the remedial action taken by the monitoring system comprises disabling, by the monitoring system, the cruise control mode of the main control system. In some implementations, the remedial action taken by the monitoring system comprises limiting or adjusting, by the monitoring system, at least one of the total torque request and its distribution for control by the main control system during the cruise control mode. In some implementations, the remedial action taken by the monitoring system comprises setting, by the monitoring system, a DTC.

In some implementations, the set of inputs indicative of the driver torque request include an accelerator pedal position and a desired speed of the vehicle for the cruise control mode. In some implementations, the set of inputs indicative of the road state/grade include a longitudinal acceleration of the vehicle, an actual speed of the vehicle, the desired vehicle speed for the cruise control mode, and a pitch rate of the vehicle. In some implementations, the determining of the upper and lower acceptable torque limits is performed based on the road state/grade, the actual vehicle speed, the desired vehicle speed for the cruise control mode, and an acceleration metric.

In some implementations, the main control system and the monitoring system are distinct portions of a single processor. In some implementations, the main control system and the monitoring system are separate cores of the single processor.

In some implementations, the main control system and the monitoring system are distributed amongst two or more distinct processors.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a functional block diagram of an example electrified vehicle according to the principles of the present disclosure;

DETAILED DESCRIPTION

Figure 2A:
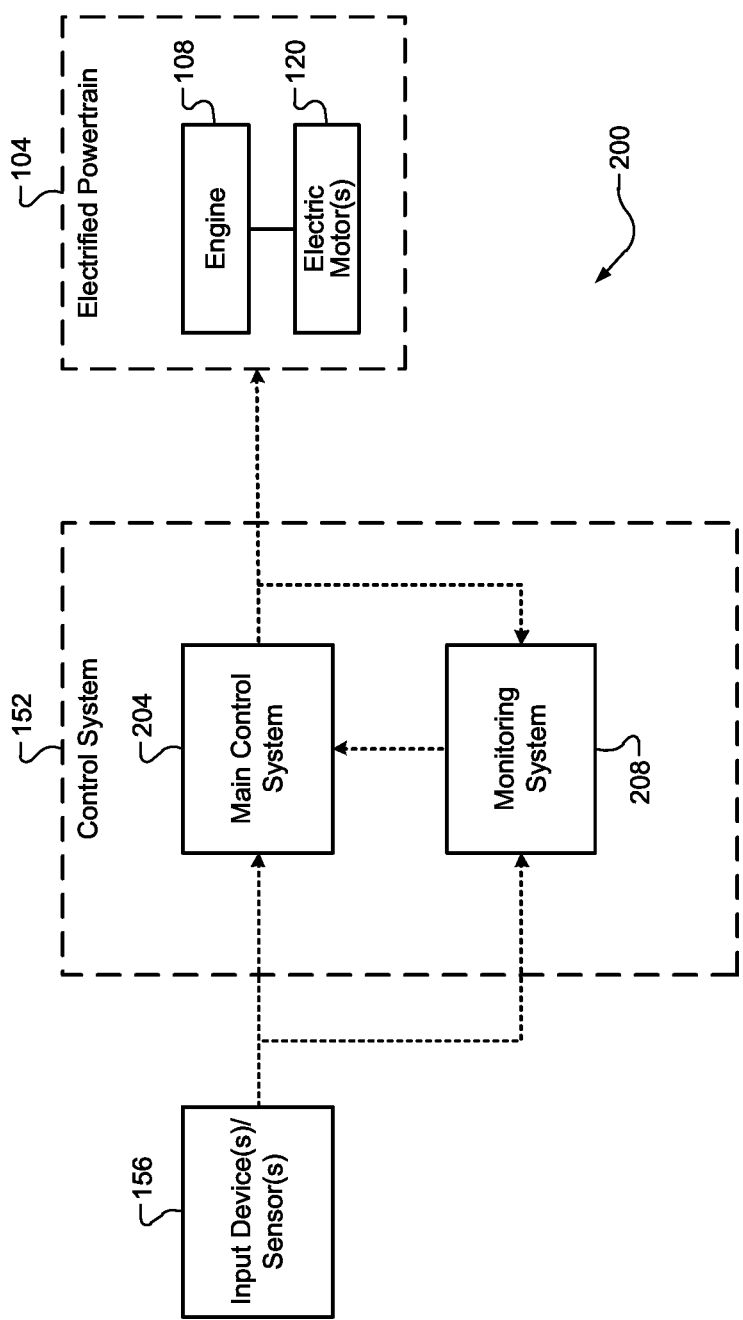
FIGS. 2A-2B are functional block diagrams of a control system of the electrified vehicle according to the principles of the present disclosure.

As discussed above, an electrified vehicle (EV) powertrain could potentially generate and output unintended propulsive torque, which is an undesirable scenario. This could be particularly undesirable during cruise control operation where unintended or accidental powertrain propulsive torque could be unsafe. Accordingly, an improved two-level monitoring architecture for monitoring a hybrid powertrain's cruise control propulsive torque is presented. When necessary, various levels of remedial action could be taken (limiting powertrain propulsive torque, disabling cruise control, etc.). A main control system and a separate monitoring system are implemented in different portions (e.g., cores) of a single processor or in separate processors. The main control system determines a desired total torque and a desired torque split (e.g., engine and motors A/B) and then controls the actuators accordingly. The key inputs are the driver torque request (accelerator pedal position, desired vehicle speed for cruise control mode, etc.) and a determined road state/grade (e.g., longitudinal acceleration and pitch rate of the vehicle, actual vehicle speed and desired vehicle speed for cruise control mode, etc.). Based on these the road state/grade, the actual vehicle speed, and an acceleration metric, the monitoring system computes upper and lower acceptable torque limits and then monitors the total torque being requested by the main control system. When the total torque request is outside of these torque limits, remedial action is taken, such as disabling cruise control. It will be appreciated that other remedial action could be taken, such as setting a diagnostic trouble code (DTC).

Referring now to FIG. 1, a functional block diagram of an example hybrid or electrified vehicle (EV) 100 is illustrated. Non-limiting examples of the vehicle 100 include a battery electric vehicle (BEV) and a plug-in hybrid electric vehicle (PHEV). The vehicle 100 includes a hybrid or electrified powertrain 104 comprising an engine 108 and a hybrid transmission 112. While the engine 108 is illustrated and described herein, it will be appreciated, however, that the vehicle 100 could only include electric motor(s) (e.g., a BEV). The engine 108 is configured to combust an air/fuel mixture within cylinders to generate drive torque at a crankshaft 116, which is coupled to one of a plurality of planetary gear sets 132 of the transmission 112. In one exemplary implementation, the transmission 112 comprises two electric propulsion motors 120A and 120B (collectively, "electric propulsion motors 120" or "electric motors 120") that are each powered by a battery system 124 and configured to generate torque that is transmitted to an output shaft 128 of the transmission 112 ("transmission output shaft 128") via one or more of the planetary gear sets 132. The engine 108 and the electric motors 120 are also referred to collectively herein as "torque generating system 122." While this specific configuration of the electrified powertrain 104 is illustrated and described herein, it will be appreciated that the techniques of the present disclosure could be applicable to any suitable electrified/hybrid powertrain.

As described herein and shown in FIG. 1, the transmission 112 could also be referred to as a continuously variable transmission (CVT) or an electrically variable transmission (EVT). In one exemplary implementation, the crankshaft 116 is coupled to a first planetary gear set 132, which is in turn connected to one of the electric motors 120. In this exemplary implementation, the other electric motor 120 is connected to one or more other planetary gear sets 132, and one or more of the planetary gear sets 132 is coupled to the transmission output shaft 128. While two electric motors 120 are illustrated herein, it will be appreciated that the vehicle 100 could include any combination of one or more electric motors that are configured to generate propulsive torque. Because the electric motors 120 are configured to generate drive torque at the transmission output shaft 128, the engine 108 could be configured to have a lower cylinder compression ratio, thereby increasing fuel economy. That is, the electric motors 120 are able to compensate for the decreased power density of (and thus a lack of drive torque produced by) such a lower-compression engine, particularly at low loads/speeds.

In one exemplary implementation, the engine 108 is an Atkinson-cycle engine comprising six cylinders and having a compression ratio of approximately 12.5:1. It will be appreciated, however, that the engine 108 could have any suitable configuration. The transmission output shaft 128 is directly coupled to a shaft 136 of a driveline 140 ("driveline shaft 140") of the powertrain 104. In one exemplary implementation, there is no disconnect or decoupling clutch disposed therebetween. Gears 144A and 144B having teeth 148A and 148B are coupled to the transmission output and driveline shafts 128, 132, respectively, and interact to transfer torque therebetween. A control system 152 comprises one or more controllers or processors and is configured to monitor and control operation of the powertrain 104, including possible remedial action when unintended powertrain propulsive torque occurs. The control system 152 receives a set of input parameters from a set of vehicle sensors and/or input devices 156. This set of input parameters is indicative of a driver torque request and a state/grade of a road along which the vehicle 100 is traveling. Non-limiting examples of the sensors/devices 156 include driver input devices (an accelerator pedal or accelerator pedal position sensor, a cruise control desired speed input device, etc.), a vehicle speed sensor, and road grade/state related sensors (a longitudinal accelerometer, a pitch rate sensor (e.g., a gyroscope), etc.). These sensors/devices 156 and the above-described parameters will be discussed in greater detail below.

Referring now to FIG. 2A, a functional block diagram of an example configuration 200 of the control system 152 is illustrated. The control system 152 comprises a main control system 204 and a monitoring system 208. The main control system 204 and the monitoring system 208 are also referred to herein as a main control system portion 204 and a monitoring system portion 208 because they could be distinct portions of a same processing device. For example, these systems 204, 208 could be implemented on distinct portions of a single processing unit, such as two or more cores of a multiple core central processing unit. Alternatively, for example, these systems 204, 208 could be implemented on distinct processing units, i.e., two or more distinct processors.

The primary reason that these systems 204, 208 are separated is to provide added redundancy in the event that the main control system 204 fails, such as due to processing or computational error or memory corruption. This is particularly true for the powertrain configuration illustrated in FIG. 1 and discussed above because the transmission 112 comprises at least one electric propulsion motor. The main control system 204 primarily determines a total torque request during a cruise control mode of the vehicle 100. This is based on driver torque request related parameters and will be discussed in greater detail below.

The monitoring system 208 monitors the total torque request and compared it to upper and lower calculated torque limits for the cruise control mode, taking into account a determined road state/grade by the main control system, which will be discussed in greater detail below. When the total torque request is outside of these torque limits, the monitoring system 208 takes remedial action, such as disabling the cruise control mode of the main control system 204 or adjusting or limiting the total torque request and/or the torque splits/distributions being requested by the main control system 204.

Figure 2B:
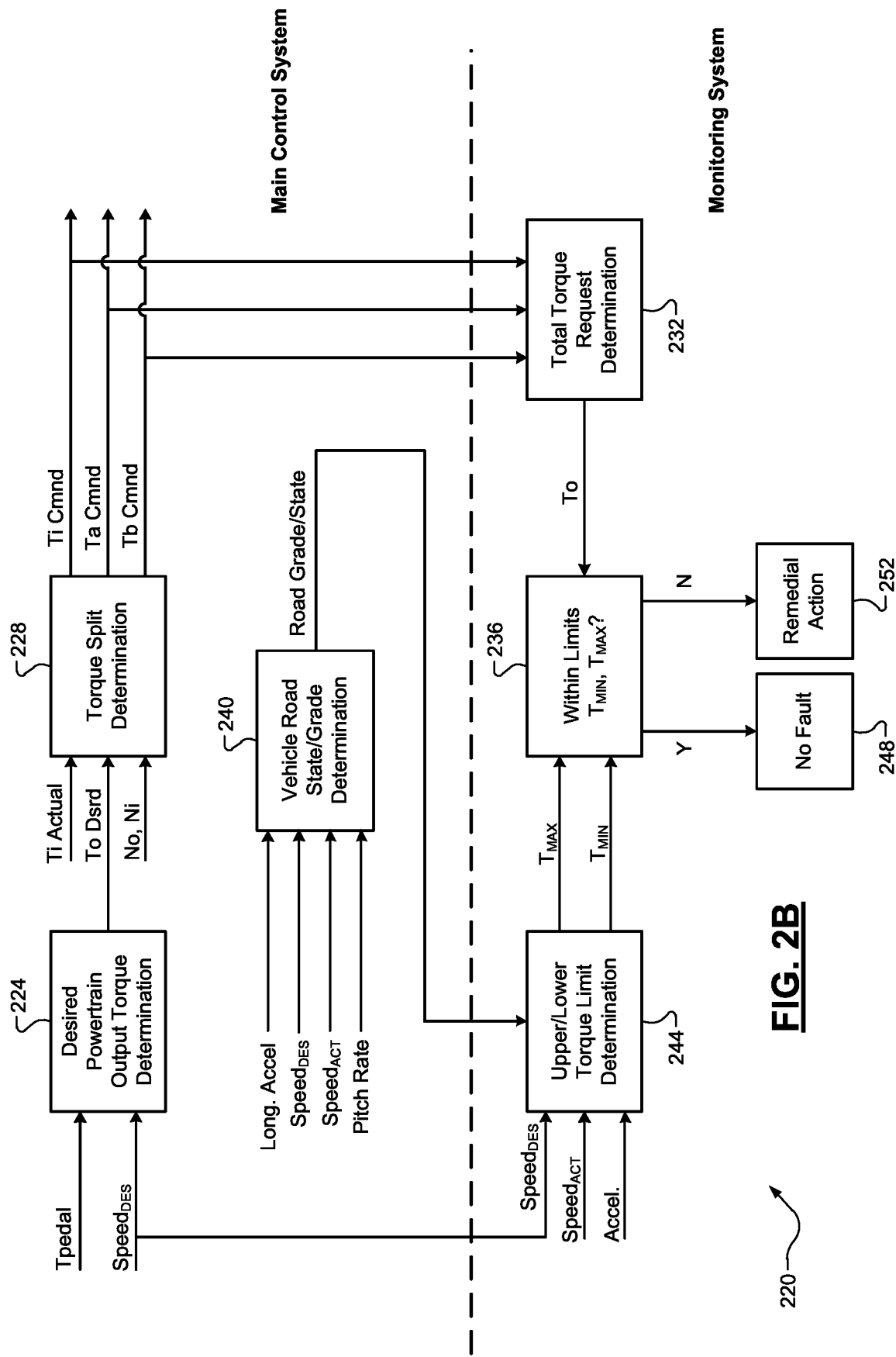

Referring now to FIG. 2B, a more specific example configuration 200 of the control system 152 is illustrated. The main control system 204 receives input parameters from some of the input devices/sensors 164, including, but not limited to, a driver pedal torque request (e.g., based on accelerator pedal position) and a desired vehicle speed for cruise control mode (e.g., provided via a driver input device). The desired vehicle speed for cruise control mode is also provided to the monitoring system 208 as shown. The main control system 204 comprises a desired powertrain output torque determination block 224 and a torque split or distribution determination block 228.

Block 224 receives the driver torque request (Tpedal) in response to accelerator pedal input and the desired vehicle speed for cruise control mode (Speed$_{DES}$). Block 224 determines a total desired or requested torque (T$_O$ Dsrd) for the electrified powertrain 104. Block 228 receives this total desired output torque, the actual engine output torque (Ti Actual), and motor parameters No, Ni. Based on these parameters, block 228 determines a torque split or distribution amongst the engine (Ti cmnd) and the electric propulsion motors (Ta cmnd, Tb cmnd). The engine command Ti cmnd may be sent prior to the motor commands Ta cmnd, Tb cmnd due to the fact that the engine response is slower than motor response. These values are all fed to an actual torque determination block 232 of the monitoring system 208, which determines the actual torque (T$_O$) being achieved by the electrified powertrain 104. The actual torque T$_O$ is fed to an actual/threshold torque comparison block 236 of the monitoring system 208.

The main control system 204 also comprises a vehicle road state/grade determination block 240 that determines a state/grade of the road along which the vehicle 100 is traveling. This determination could be made, for example, based on longitudinal acceleration of the vehicle 100 (e.g., from a longitudinal accelerometer of sensor(s)/device(s) 164), a pitch rate of the vehicle 100 (e.g., from a gyroscope of the sensor(s)/device(s) 164), an actual speed of the vehicle 100 (Speed$_{ACT}$) (e.g., from a vehicle speed sensor of the sensor(s)/device(s) 164), and the desired vehicle speed for cruise control operation Speed$_{DES}$. It will be appreciated that other information could be utilized to determine road state and/or grade conditions, such as global positioning system (GPS) information and map/traffic data. It will also be appreciated that this determination could employ at least some predictive techniques, and thus there could be a Z-transform block (not shown), such as a linear prediction Z-transform, implemented after block 240 and before an upper/lower torque limit determination block 244. The upper/lower torque limit determination block 244 of the monitoring system 208 determines upper and lower torque limits (T$_{MAX}$, T$_{MIN}$) for the cruise control mode based on the determined road state/grade and also the desired vehicle speed Speed$_{DES}$, the actual vehicle speed Speed$_{ACT}$, and an acceleration metric (Accel). The road state/grade is an important factor in determining the upper and lower acceptable torque limits T$_{MAX}$, T$_{MIN}$, because there could be scenarios where the road state/grade could be indicative of higher or lower acceptable torque limits T$_{MAX}$, T$_{MIN}$. For example only, the vehicle 100 could be traveling up a steep uphill grade and thus a larger upper torque limit T$_{MAX}$ would be more acceptable (e.g., compared to traveling downhill). Similarly, a road state indicative of heavy traffic could indicate lower acceptable limits.

Figure 2C:
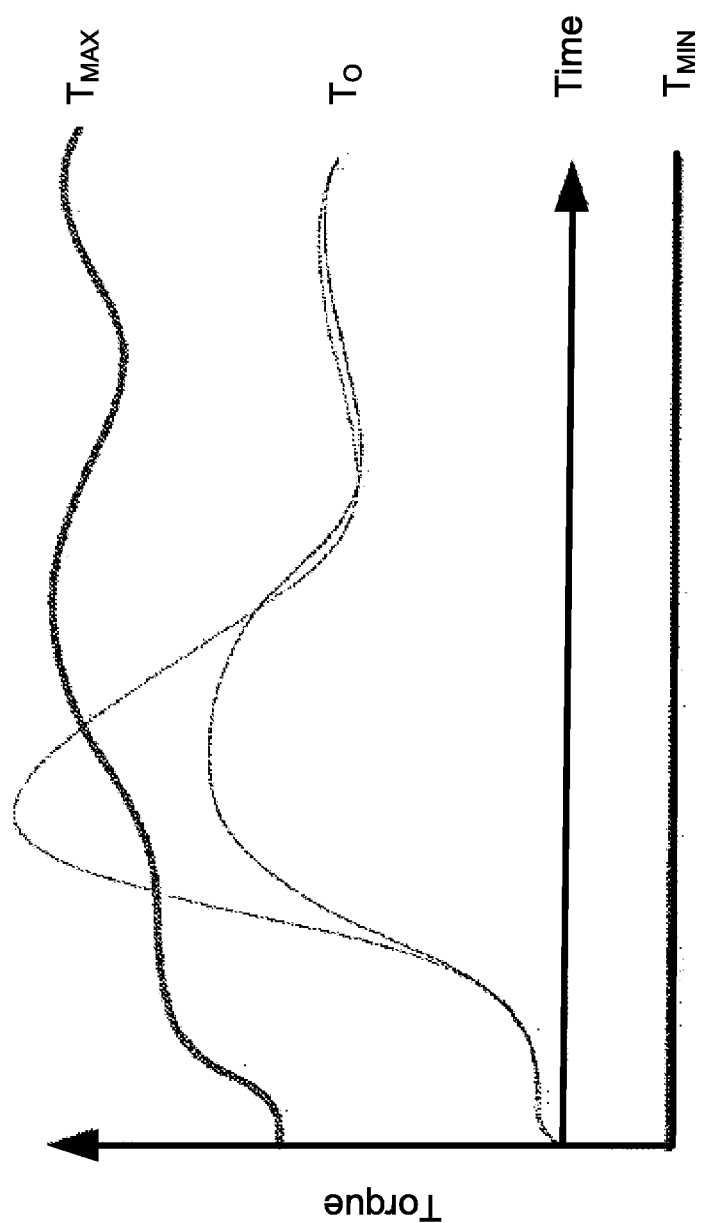
FIG. 2C is an example plot of vehicle powertrain cruise control propulsive torque that exceeds allowable torque limits and would trigger remedial action according to the principles of the present disclosure.

Block 236 of the monitoring system compares the actual torque T$_O$ to see if it is within or is outside of the upper and lower torque limits T$_{MAX}$, T$_{MIN}$. When the actual torque T$_O$ is within the upper and lower torque limits T$_{MAX}$, T$_{MIN}$, no remedial action is taken (i.e., no fault or malfunction is detected at block 248). The cruise control mode by the main control system 204 can therefore continue. If the acceptable torque value of T$_O$ keeps growing such that it passes one of these upper and lower torque limits T$_{MAX}$, T$_{MIN}$, as depicted in the plot of FIG. 2C (T$_O$ exceeds T$_{MAX}$), the monitoring system 208 determines that a critical malfunction or fault has occurred within the main control system 204 and therefore takes a remedial action at block 252, such as disabling the cruise control mode of the main control system 204. As previously discussed, it will be appreciated that there could be other remedial actions that could be taken and/or that different remedial actions could be taken according to a severity hierarchy. Non-limiting examples of other remedial actions that could be take include setting a DTC (less severe), adjusting or limiting either the total torque request or the torque split/distribution of the main control system 204 (also known as a "limp-home mode"), and fully disabling the electrified powertrain 104 after the vehicle 100 safely slows to a standstill, such as the end of a current key-cycle (e.g., by the main control system 204 being commanded to set all torque requests to zero).

Figure 3:
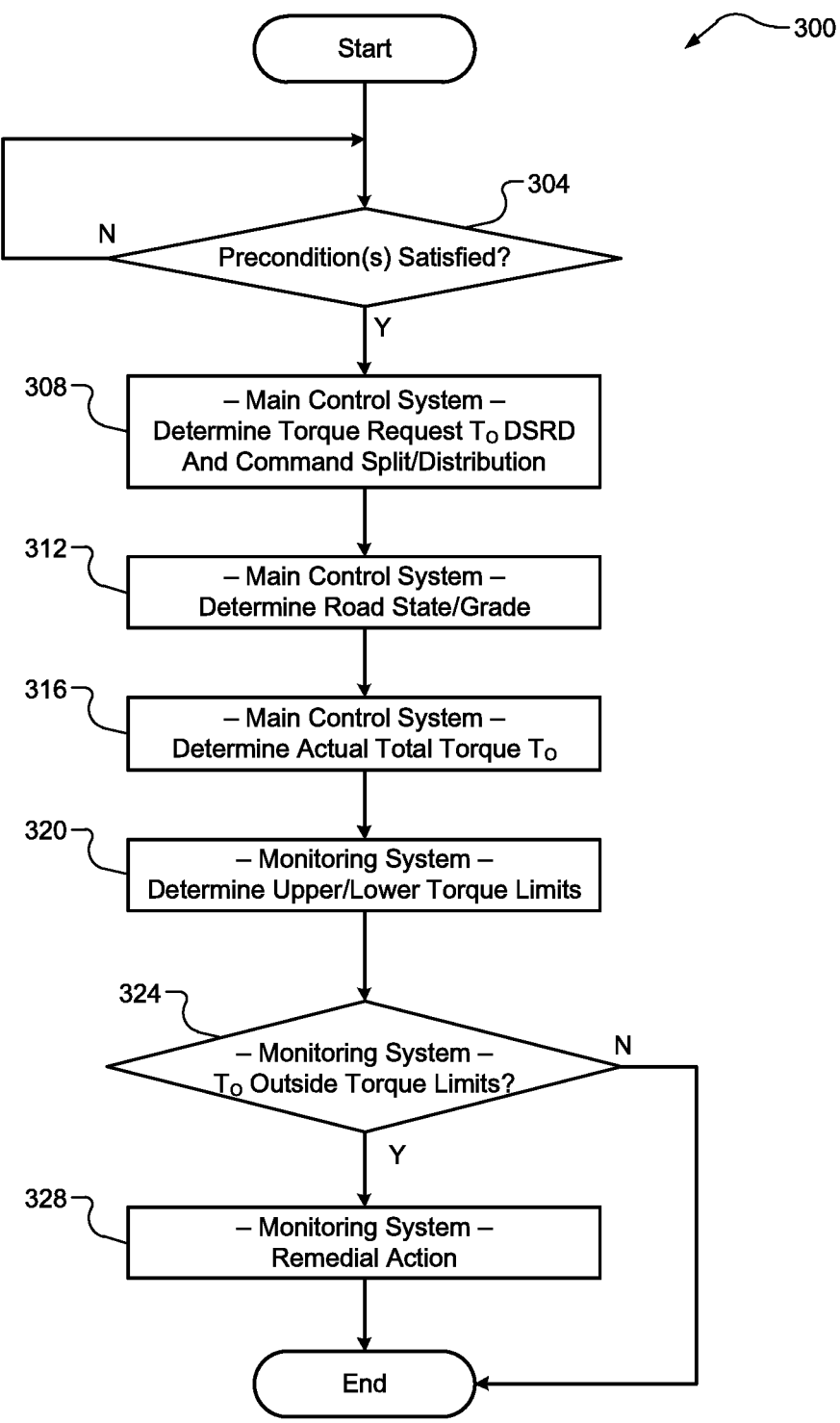
FIG. 3 is a flow diagram of an example method of monitoring electrified vehicle powertrain cruise control propulsive torque and taking remedial action when needed according to the principles of the present disclosure.

Referring now to FIG. 3, a flow diagram of an example method 300 of monitoring powertrain propulsive torque and taking remedial action when needed for a cruise control mode of an electrified vehicle illustrated. While vehicle 100 and its components are specifically referenced, it will be appreciated that the method 300 could be applicable to any suitable electrified vehicle with a hybrid powertrain. At 304, the control system 152 optionally determines whether one or more preconditions are satisfied. This could include, for example, determining whether there are any existing malfunctions that would preclude vehicle operation, such as the DTC described above having previously been set. When the one or more optional preconditions are satisfied, the method 300 proceeds to 308 where the main control system 204 determines the total torque request $T_O$ Dsrd based on driver requested pedal torque $T_{PEDAL}$ and the desired vehicle speed for cruise control mode $Speed_{DES}$ and also a torque split or distribution between the engine and the electric motor(s) (e.g., Ti cmd, Ta cmd, Tb cmd) and commands the actuators (engine 108, motor(s) 120, etc.) accordingly. At 312, the main control system 204 determines the road state/grade based on longitudinal acceleration and pitch rate of the vehicle 100 and the actual and desired vehicle speeds $Speed_{ACT}$, $Speed_{DES}$.

At 316, the main control system 204 determines or calculates the actual torque $T_O$ being generated by the electrified powertrain 104. At 320, the monitoring system 208 determines the upper and lower torque limits $T_{MAX}$, $T_{MIN}$ based on the road state/grade, the desired vehicle speed for cruise control mode $Speed_{DES}$, the actual vehicle speed $Speed_{ACT}$, and the acceleration metric. This acceleration metric could be, for example, based on other operating conditions or could be a predetermined metric for appropriate acceleration of the particular vehicle 100 or for a particular driver. At 324, the monitoring system 208 determines whether the actual torque $T_O$ is within or outside of the upper and lower torque limits $T_{MAX}$, $T_{MIN}$. When the actual torque $T_O$ is within the upper and lower torque limits $T_{MAX}$, $T_{MIN}$, no fault or malfunction is detected and cruise control mode can continue as normal and the method 300 ends or returns to 304. Otherwise, the monitoring system 208 takes one or more remedial actions with respect to the cruise control mode at 328. This could include, for example only, setting a DTC, disabling cruise control mode, adjusting/limiting torque requests/distributions (e.g., limp-home mode), and the like. The method 300 then ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A powertrain propulsive torque monitoring and remedial action system for a cruise control mode of an electrified vehicle having an electrified powertrain, the system comprising:
  a set of input devices/sensors configured to receive a set of inputs indicative of a driver torque request and a state/grade of a road along which the vehicle is traveling, wherein the set of inputs indicative of the driver torque request includes an accelerator pedal position and a desired speed of the vehicle for the cruise control mode, and wherein the set of inputs indicative of the road state/grade includes a longitudinal acceleration of the vehicle, an actual speed of the vehicle, the desired vehicle speed for the cruise control mode, and a pitch rate of the vehicle; and
  a control system comprising a main control system and a monitoring system that are distinct from each other, wherein:
    the main control system is configured to operate the vehicle in the cruise control mode including (i) determining a total torque request for the electrified powertrain, (ii) determining and commanding a distribution of the total torque request to the electrified powertrain, and (iii) determining the road state/grade based on at least some of the set of inputs; and
    the monitoring system is configured to monitor the main control system during the cruise control mode including (i) determining the actual torque generated by the electrified powertrain, (ii) determining upper and lower acceptable torque limits for the cruise control mode based on the road state/grade from the main control system, and (iii) taking remedial action when the actual torque is outside of the upper and lower acceptable torque limits.

2. The system of claim 1, wherein the remedial action taken by the monitoring system comprises disabling the cruise control mode of the main control system.

3. The system of claim 1, wherein the remedial action taken by the monitoring system comprises limiting or adjusting at least one of the total torque request and its distribution for control by the main control system during the cruise control mode.

4. The system of claim 1, wherein the remedial action taken by the monitoring system comprises setting a diagnostic trouble code (DTC).

5. The system of claim 1, wherein the monitoring system is configured to determine the upper and lower acceptable torque limits based on the road state/grade, the actual vehicle speed, the desired vehicle speed for the cruise control mode, and an acceleration metric.

6. The system of claim 1, wherein the main control system and the monitoring system are distinct portions of a single processor.

7. The system of claim 6, wherein the main control system and the monitoring system are separate cores of the single processor.

8. The system of claim 1, wherein the main control system and the monitoring system are distributed amongst two or more distinct processors.

9. A powertrain propulsive torque monitoring and remedial action method for a cruise control mode of an electrified vehicle having an electrified powertrain, the method comprising:
  obtaining, from a set of input devices/sensors, a set of inputs indicative of a driver torque request and a state/grade of a road along which the vehicle is traveling, wherein the set of inputs indicative of the driver torque request includes an accelerator pedal position and a desired speed of the vehicle for the cruise control mode, and wherein the set of inputs indicative of the road state/grade includes a longitudinal acceleration of the vehicle, an actual speed of the vehicle, the desired vehicle speed for the cruise control mode, and a pitch rate of the vehicle;

operating, by a main control system of the vehicle, in a cruise control mode including:
- determining a total torque request for the electrified powertrain,
- determining and commanding a distribution of the total torque request to the electrified powertrain, and
- determining the road state/grade based on at least some of the set of inputs; and monitoring, by a monitoring system of the vehicle that is distinct from the main control system, the main control system during the cruise control mode including:
- determining an actual torque being generated by the electrified powertrain,
- determining upper and lower acceptable torque limits for the cruise control mode based on the road state/grade, and
- taking remedial action regarding the cruise control mode when the actual torque is outside of the upper and lower acceptable torque limits.

10. The method of claim 9, wherein the remedial action taken by the monitoring system comprises disabling, by the monitoring system, the cruise control mode of the main control system.

11. The method of claim 9, wherein the remedial action taken by the monitoring system comprises limiting or adjusting, by the monitoring system, at least one of the total torque request and its distribution for control by the main control system during the cruise control mode.

12. The method of claim 9, wherein the remedial action taken by the monitoring system comprises setting, by the monitoring system, a diagnostic trouble code (DTC).

13. The method of claim 9, wherein the determining of the upper and lower acceptable torque limits is performed based on the road state/grade, the actual vehicle speed, the desired vehicle speed for the cruise control mode, and an acceleration metric.

14. The method of claim 9, wherein the main control system and the monitoring system are distinct portions of a single processor.

15. The method of claim 14, wherein the main control system and the monitoring system are separate cores of the single processor.

16. The method of claim 9, wherein the main control system and the monitoring system are distributed amongst two or more distinct processors.

* * * * *